United States Patent
He (10) Patent No.: US 12,094,470 B2
(45) Date of Patent: Sep. 17, 2024

(54) VOICE RECOGNITION DEVICE, WAKING-UP AND RESPONDING METHOD OF THE SAME, AND COMPUTER STORAGE MEDIUM

(71) Applicants: Guangdong Midea White Home Appliance Technology Innovation Center Co., Ltd., Foshan (CN); Midea Group Co., Ltd., Foshan (CN)

(72) Inventor: Ruicheng He, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD, Foshan (CN)

(*) Notice: Subject to any disclaimer, the term of this patent is extended or adjusted under 35 U.S.C. 154(b) by 391 days.

(21) Appl. No.: 17/452,223

(22) Filed: Oct. 25, 2021

(65) Prior Publication Data
US 2022/0044685 A1    Feb. 10, 2022

Related U.S. Application Data

(63) Continuation of application No. PCT/CN2019/123811, filed on Dec. 6, 2019.

(30) Foreign Application Priority Data

Apr. 26, 2019 (CN) .................. 201910343067.8

(51) Int. Cl.
*G10L 15/00*   (2013.01)
*G10L 15/22*   (2006.01)
*G10L 15/30*   (2013.01)

(52) U.S. Cl.
CPC .............. *G10L 15/30* (2013.01); *G10L 15/22* (2013.01)

(58) Field of Classification Search
CPC ......... G10L 15/30; G10L 15/22; G10L 15/26; G10L 25/84; G10L 2015/088;
(Continued)

(56) References Cited

U.S. PATENT DOCUMENTS 10,026,399 B2 * 7/2018 Gopalan ................. G10L 15/22
10,354,653 B1 * 7/2019 Vijayvergia ............ G10L 15/26
(Continued)

FOREIGN PATENT DOCUMENTS

| CN | 107452386 A | 12/2017 |
| CN | 107622767 A | 1/2018 |

(Continued)

OTHER PUBLICATIONS

Extended European Search Report, EP19926004.3, Apr. 28, 2022, 8 pgs.
(Continued)

*Primary Examiner* — Douglas Godbold
*Assistant Examiner* — Parker Mayfield
(74) *Attorney, Agent, or Firm* — Morgan, Lewis & Bockius LLP (57) ABSTRACT

The present application discloses a waking-up and responding method for a voice recognition device, a voice recognition device, and a computer storage medium. A plurality of voice recognition devices form an area network. The plurality of voice recognition devices are classified into a central device and at least one non-central device. The waking-up and responding method includes: the central device analyzing the collected voice signal to obtain a response factor of the central device; receiving a response factor of the non-central device, the response factor of the (Continued)

non-central device being obtained by the non-central device analyzing the collected voice signal; comparing the response factor of the central device with the response factor of the non-central device; and determining a pending voice recognition device, the pending voice recognition device being a voice recognition device that is in the area network and responds to the voice signal.

18 Claims, 4 Drawing Sheets

(58) Field of Classification Search
CPC ......... G10L 15/28; G10L 17/24; Y02D 30/70; G06F 3/167; G06F 3/16; H04L 12/28
See application file for complete search history.

(56) References Cited

U.S. PATENT DOCUMENTS

| | | | |
|---|---|---|---|
| 2017/0269975 A1* | 9/2017 | Wood | G10L 15/1815 |
| 2017/0357478 A1 | 12/2017 | Piersol et al. | |
| 2018/0277113 A1* | 9/2018 | Hartung | G10L 15/22 |
| 2018/0342151 A1* | 11/2018 | VanBlon | G06F 3/011 |
| 2019/0012141 A1* | 1/2019 | Piersol | G10L 15/30 |
| 2019/0213490 A1* | 7/2019 | White | G06N 5/043 |
| 2019/0341049 A1* | 11/2019 | Cheng | G06F 1/3206 |

FOREIGN PATENT DOCUMENTS

| | | |
|---|---|---|
| CN | 107919119 A | 4/2018 |
| CN | 108766422 A | 11/2018 |
| CN | 109215663 A | 1/2019 |
| CN | 109377987 A | 2/2019 |
| CN | 109391528 A | 2/2019 |
| CN | 109658927 A | 4/2019 |
| EP | 3407165 A2 | 11/2018 |
| JP | 2017107333 A | 6/2017 |
| KR | 20170036805 A | 4/2017 |
| KR | 20170049817 A | 5/2017 |
| WO | WO 2018075660 A1 | 4/2018 |

OTHER PUBLICATIONS

Midea Group Co., Ltd., Chinese Office Action, CN Patent Application No. 201910343067.8, Aug. 29, 2022, 15 pgs.
Midea Group Co., Ltd., Japanese Office Action, JP Patent Application No. 2021-562155, Oct. 24, 2022, 8 pgs.
Midea Group Co., Ltd., Japanese Decision to Grant Patent, JP Patent Application No. 2021-562155, Apr. 6, 2023, 5 pgs.
Midea Group Co., Ltd., IPRP, PCT/CN2019/123811, Sep. 28, 2021, 5 pgs.
Guangdong Midea White Appliance Technology Innovation Center, Co., International Search Report and Written Opinion, PCT/CN2019/123811, Mar. 17, 2020, 16 pgs.
Midea Group Co., Ltd., European Office Action, EP Patent Application No. 19926004.3, Jul. 11, 2023, 5 pgs.
Midea Group Co., Ltd., European Office Action, EP Patent Application No. 19926004.3, Mar. 14, 2024, 4 pgs.
Midea Group Co., Ltd., Korean Office Action, KR Patent Application No. 10-2021-7033362, May 10, 2024, 13 pgs.

* cited by examiner

VOICE RECOGNITION DEVICE, WAKING-UP AND RESPONDING METHOD OF THE SAME, AND COMPUTER STORAGE MEDIUM

CROSS REFERENCE TO RELATED APPLICATIONS

This application is a continuation of International (PCT) Patent Application No. PCT/CN2019/123811 filed on Dec. 6, 2019, which claims priority to a Chinese Application No. 201910343067.8, filed on Apr. 26, 2019, to the China National Intellectual Property Administration, and the entire contents of which are hereby incorporated by reference in their entirety.

TECHNICAL FIELD

This disclosure relates to the technical field of waking-up by voice, in particular to a waking-up and responding method of a voice recognition device, a voice recognition device, and a computer storage medium.

BACKGROUND

Voice recognition, voice interaction and other technologies have been applied in various fields. A device equipped with a voice recognition system may be woken up after receiving a voice signal, and then respond to the voice signal.

A plurality of voice recognition devices in a same area or a plurality of adjacent areas may be woken up by the voice signal and respond to the voice signal at the same time. In a general application scenario, a user may obviously wake up only one voice recognition device. Further, when the plurality of voice recognition devices are woken up and respond at the same time, the plurality of voice recognition devices may mutually interfere each other. For example, one of the plurality of voice recognition devices may respond to the voice signal and generate a broadcasting voice, and the broadcasting voice may be received and responded by another one of the plurality of voice recognition devices, and vice versa, and that is an issue of mutual interference.

SUMMARY

The present disclosure provides a waking-up and responding method of a voice recognition device, a voice recognition device, and a computer storage medium, to solve a problem of mutual interference caused by a plurality of voice recognition devices responding to a waking-up voice at the same time in the related art.

To solve the above technical problem, the present disclosure provides a waking-up and responding method of a voice recognition device. A plurality of voice recognition devices form an area network, the plurality of voice recognition devices include one central device and at least one non-central device, and the waking-up and responding method includes: analyzing, by the central device, a collected voice signal, obtaining a response factor of the central device; receiving a response factor of the non-central device, wherein the response factor of the non-central device is obtained by the non-central device analyzing the collected voice signal; comparing the response factor of the central device with the response factor of the non-central device; and determining a pending voice recognition device, wherein the pending voice recognition device is one of the plurality of voice recognition devices in the area network that responds to the voice signal.

To solve the above technical problem, the present disclosure provides a waking-up and responding method of a voice recognition device. A plurality of voice recognition devices form an area network, the plurality of voice recognition devices include one central device and at least one non-central device, and the waking-up and responding method includes: analyzing, by the non-central device, a collected voice signal, obtaining a response factor of the non-central device; and sending the response factor of the non-central device to the central device, comparing, by the central device, the response factor of the non-central device with the response factor of the central device to determine a pending voice recognition device, wherein the pending voice recognition device is one of the plurality of voice recognition devices in the area network that responds to the voice signal.

To solve the above technical problem, the present disclosure provides a voice recognition device, including a processor and a memory. The memory stores a computer program, the processor is configured to execute the computer program to implement the operations of the waking-up and responding method.

According to the waking-up and responding method of the present disclosure, a plurality of voice recognition devices form an area network. Each of the plurality of voice recognition devices collects a voice signal and analyzes the collected voice signal to obtain a response factor. The plurality of voice recognition devices include a central device and at least one non-central device. The central device acquires its own response factor and receives the response factor of the non-central device. The central device compares its own response factor with the response factor of the non-central device to determine a pending voice recognition device. The pending voice recognition device is one of the plurality of voice recognition devices in the present area network that responds to the voice signal. In the present disclosure, after the voice recognition devices that form the area network are woken up by the voice signal, the voice recognition devices do not respond to the voice signal temporarily. The central device firstly determines which one of the plurality of voice recognition devices should respond, avoiding the mutual interference caused by the plurality of voice recognition devices responding.

DETAILED DESCRIPTION

In order to enable a person skilled in the art to better understand the technical solution of the present disclosure, the following is a further detailed description of a method of a voice recognition device being woken-up and responding, a voice recognition device and a computer storage medium provided in the present disclosure, referring to the accompanying drawings and specific implementations.

In the present disclosure, the waking-up responding method is applied to a situation where a plurality of voice recognition devices may all respond to one same voice signal. In this case, taking domestic appliances as examples, a plurality of domestic appliances are present in one same area or a plurality of adjacent areas. Each of plurality of domestic appliances has a voice recognition function, i.e., serving as a voice recognition device. For example, voice recognition devices such as a TV set, an air conditioner, a refrigerator, and the like, may be present in a living room area; and voice recognition devices such as a refrigerator, a microwave oven, a kettle, a rice cooker, and the like, may be present in a kitchen area. When the user in the living room area sends the voice signal, due to sound propagation, the plurality of domestic appliances in the living room area may receive the voice signal and respond to the voice signal. In this way, the plurality of domestic appliances may respond, and in this case, a responsive sound sent from the domestic appliance A may be received and responded by the domestic appliance B, such that the plurality of domestic appliances may mutually interfere each other, resulting in the domestic appliances being unable to respond to the user's demand appropriately. In another example, when the user in an area between the living room area and the kitchen area sends the voice signal, the domestic appliances in both areas can receive the voice signal and respond to the voice signal, causing the mutual interference.

In the present disclosure, the voice recognition device applies a mode of waking-up first and responding subsequently. That is, the voice recognition device is woken up firstly by the voice signal sent by the user, and subsequently, responds to the voice signal. In this regard, in the present disclosure, a selective determination mechanism is introduced between waking-up and responding. That is, after the voice recognition device is woken up by the voice signal, the voice recognition device temporarily does not respond, but responds when the voice recognition device is determined to give a response.

Specifically, for a single area, the plurality of voice recognition devices are interconnected to form an area network. One of the plurality of voice recognition devices serves as a central device in the area network, and the central device determines which voice recognition device in the area network responds to the voice signal.

For multiple area networks, firstly, the central device in each of the multiple area networks determines a pending voice recognition device that will respond to the voice signal in the respective area network. Subsequently, a first central device among all central devices determines the pending voice recognition device in which area network will respond to the voice signal. In this way, the mutual interference caused by the plurality of voice recognition devices all responding to the voice signal may be solved.

In the application of domestic appliances, as the central device needs to be able to respond to the user's voice signal at any time to determine the device that responds to the voice signal, the domestic appliance, which is connected to the power supply for a long time and is substantially never out of power, may be selected to serve as the central device. Further, the domestic appliance having an interactive screen may be preferably selected to serve as the central device, such that relevant settings may be performed through the interactive screen. For example, the refrigerator may serve as the central device.

Generally, the domestic appliances in each area, such as in the living room area and in the kitchen area, can form the area network respectively. The area network corresponds to division of areas. In terms of network connection, the domestic appliances do not have to form one single area network. That is, the domestic appliances in all areas of a house may be interconnected to form an integral domestic appliance network.

In the present disclosure, the formed network includes and is not limited to a local area network composed of Wi-Fi® wireless networks, a local area network composed of wired networks, a local area network composed of Bluetooth® mesh, a local area network composed of zigbee®, a local area network composed of RS485, a local area network composed of LoRa, a local area network composed of 1394, a local area network composed of CAN, and the like. A communication protocol of the network includes and is not limited to UDP, TCP/IP, HTTP, MQTT, CoAP, and the like, to ensure that each voice recognition device in the same network interacts with each other rapidly and reliably.

In the present disclosure, the waking-up and responding method will be illustrated by starting from the network formed by the voice recognition devices.

Figure 1:
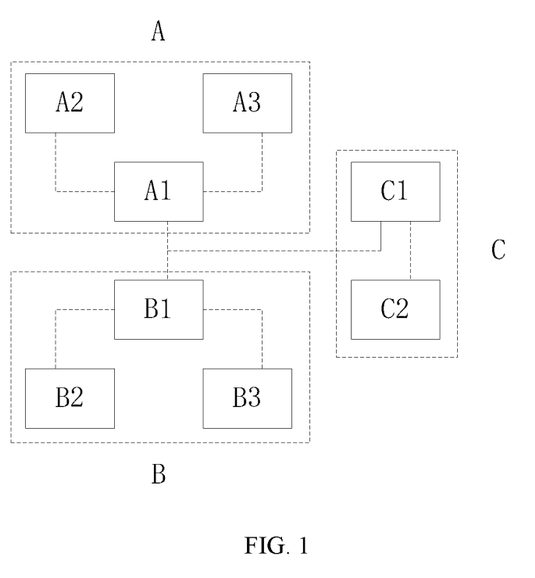
FIG. 1 is a structural schematic view of a network formed by voice recognition devices connecting with each other according to the present disclosure.

As shown in FIG. 1, FIG. 1 is a structural schematic view of a network formed by voice recognition devices connecting with each other according to the present disclosure. In FIG. 1, the areas are divided into a living room area A, a kitchen area B, and a bedroom area C. In the living room area A, the voice recognition devices include: a refrigerator A1, a television A2, and an air purifier A3. In the kitchen area B, the voice recognition devices include: a range hood B1, a rice cooker B2, and a wall breaker B3. In the bedroom area C, the voice recognition devices include: an air conditioner C1 and a humidifier C2. All of the voice recognition devices are connected to form a network, and the voice recognition devices in each area also form an area network.

The voice devices in each area network are classified into one central device and at least one non-central device. The central device determines a pending voice recognition device in the respective area network that responds to the voice signal. The central devices of all area networks include one first central device and at least one second central device. The first central device determines the pending voice recognition device in which area network responds to the voice signal.

In some embodiments, the voice devices in the area network include the central and the non-central devices. In addition, each voice device has a waking-up priority. The waking-up priority may be set by a manufacturer when the voice recognition device is released. After the voice recognition devices are connected to form the network, the voice recognition device having the highest waking-up priority automatically serves as the central device of the area network. The waking-up priority may also be set while the network is being established. The user or the service provider who establishes the network may set the waking-up priority. According to the set waking-up priority, the voice recognition device having the highest waking-up priority servers as the central device of the network.

In the network shown in FIG. 1, an order of priorities of the devices in the living room area A is A1>A2>A3, an order of priorities of the devices in the kitchen area B is B1>B2>B3, and an order of priorities of the devices in the bedroom area C is C1>C2. The device A1, the device B1, and the device C1 serve as the central devices of the respective area networks. An order of priorities of the central devices among various areas is A1>B1>C1. In the present disclosure, the device A1 serves as the first central device, and the device B1 and the device C1 serve as the second central devices.

Figure 2:
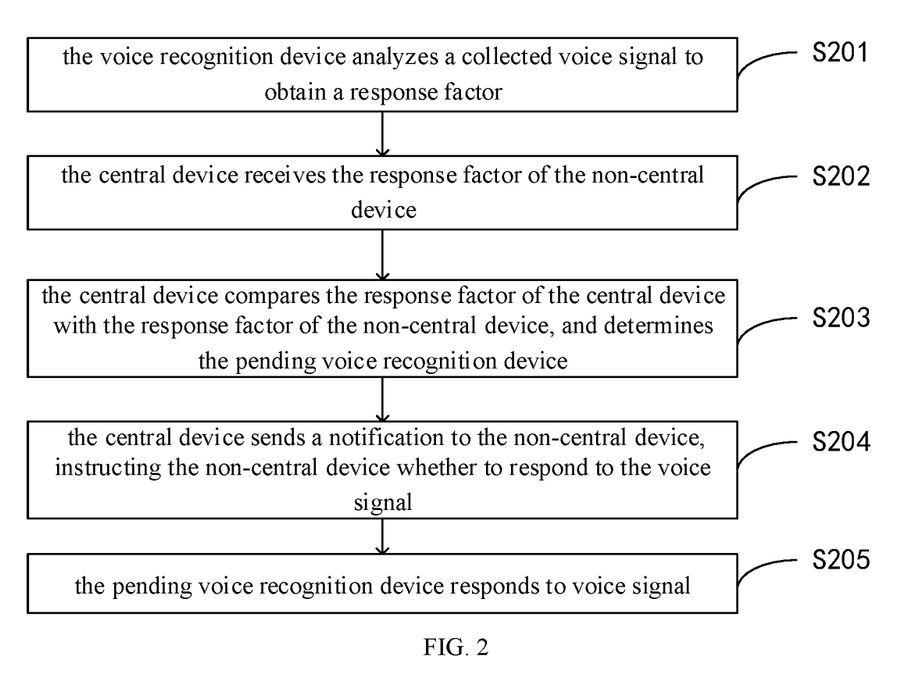
FIG. 2 is a flow chart of a waking-up and responding method of a voice recognition device, which is applied in one area network, according to the present disclosure.
Figure 3:
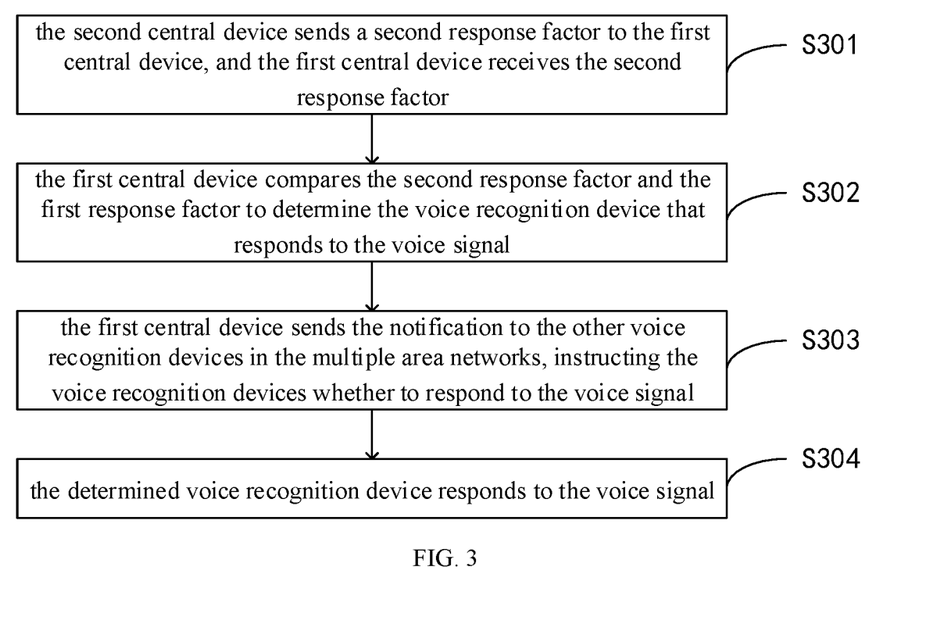
FIG. 3 is a flow chart of a waking-up and responding method of a voice recognition device, which is applied in multiple area networks, according to the present disclosure.

The network shown in FIG. 1 can achieve waking-up and responding in a single area and in multiple areas. As shown in FIG. 2 and FIG. 3, FIG. 2 is a flow chart of a waking-up and responding method of a voice recognition device, which is applied in one area network, according to the present disclosure, and FIG. 3 is a flow chart of a waking-up and responding method of a voice recognition device, which is applied in multiple area networks, according to the present disclosure.

As shown in FIG. 2, the waking-up and responding method in one area network includes following operations.

In an operation S201, the voice recognition device analyzes a collected voice signal to obtain a response factor.

In the present operation, the voice recognition device substantially performs two operations, collection and analysis. After the user, i.e., a signal source, sends the voice signal, each voice recognition device collects the voice signal. As the plurality of voice recognition devices are placed at various positions relative to the user, the voice signals collected by the plurality of voice recognition devices may be various. Although the voice recognition device, which is placed relatively far away from the user, is located in the area network, the voice recognition device may be unable to collect the voice signal.

Each voice recognition device analyzes the respective collected voice signal. In some embodiments, each voice recognition device in each area network applies a same analysis mechanism for analyzing the voice signal, such that subsequent analysis and calculation of the voice signal may be performed easily. The response factor is obtained by analyzing and calculating the voice signal and indicates a correspondence level that the voice recognition device corresponds to the voice signal, i.e. a possibility of the voice signal being sent specifically for the voice recognition device.

As the pending voice recognition device that will respond to the voice signal is determined based on the response factor, the response factor includes an identifier of the voice recognition device and an energy value for determination. The energy value of the response factor can be calculated based on voice characteristics of the voice signal and a matching degree between the voice signal and a waking-up template in the voice recognition device. The voice characteristics may be a volume of the voice signal. The greater the volume, the closer the voice recognition device is placed relative to the user; and the higher the matching degree for the waking-up template in the voice recognition device, the higher possibility the user sends the voice signal specifically for the voice recognition device.

Further, the energy value of the response factor may be calculated as follows.

A waking-up energy E1 is calculated based on the voice characteristics of the voice signal. A ground noise energy E2 is calculated based on voice characteristics of environmental noise of an environment at which the voice recognition device is located. A difference between the waking-up energy and the ground noise energy may be taken as an effective energy E=E1−E2.

A confidence degree P is calculated based on the matching degree between the voice signal and the waking-up template. The confidence degree P indicates the matching degree between the voice signal and the waking-up template. When the voice recognition device is woken up by the voice signal, the matching degree between the voice signal and the waking-up template may be determined. For example, complete matching may be recorded as 100%, and mostly matching may be recorded as 90%, 80% or 70%, and the like. When the matching degree exceeds a certain threshold, it is determined that the voice recognition device may be woken up. Accordingly, the confidence level P calculated while calculating the waking-up factor energy corresponds to the matching degree between the voice signal and the waking-up template at the time of the voice recognition device being woken up. For example, P may be 1, 0.9, 0.8, 0.7, and the like.

The effective energy E and the confidence degree P are weighted and summed to obtain the energy value K of the response factor.

$K=xE+yP$, where x is a weight of the effective energy E, and y is a weight of the confidence degree P.

The weights x and y may be fixed values. Alternatively, the weights x and y may be variable among a plurality of sets of fixed values. Alternatively, the weights x and y may be varied and adjusted based on accuracy of the determination of the voice recognition device that responds to the voice signal.

For the area A in some embodiments, the energy value of the response factor obtained by the device A1 is recorded as K1, the energy value of the response factor obtained by the device A2 is recorded as K2, and the energy value of the response factor obtained by the device A3 is recorded as K3.

In the present operation S201, the central device analyzes the collected voice signal and obtains the response factor of the central device, and the non-central device analyzes the collected voice signal and obtains the response factor of the non-central device.

In an operation S202, the central device receives the response factor of the non-central device.

After the voice recognition device performs calculation to obtain the response factor, the non-central device sends the obtained response factor to the central device. In some embodiments, the central device A1 receives the response factors sent by the non-central devices.

In an operation S203, the central device compares the response factor of the central device with the response factor of the non-central device and determines the pending voice recognition device.

In the present operation, the central device compares the response factor of the central device with the response factor of the non-central device to determine the pending voice recognition device in the area network that will respond to the voice signal. In detail, the central device applies a sorting algorithm to compare the energy values of the response factors and obtain an order of the energy values of all the response factors, such that a response factor having a greatest energy value is obtained. The sorting algorithm includes and is not limited to insertion sorting, Hill sorting, selection sorting, heapsort, bubble sorting, fast sorting, merge sorting, computational sorting, bucket sorting, radix sorting, and the like. In some embodiments, the order of the energy values of the response factors is K2>K1>K3.

Based on the comparison of the energy values of the response factors, the pending voice recognition device that will respond to the voice signal may be determined. The specific determination process may be done in various ways.

For example, after obtaining the response factor having the greatest energy value, the corresponding voice recognition device may be determined as the pending voice recognition device that will respond to the voice signal.

In another example, after obtaining the response factor having the greatest energy value, in response to the response factor having the greatest energy value being the response factor of the central device, i.e. if the response factor having the greatest energy value is the response factor of the central device, the central device is determined to be the pending voice recognition device.

In response to the response factor having the greatest energy value being the response factor of the non-central device, i.e., if the response factor having the greatest energy value is the response factor of the non-central device, in some embodiments, the greatest energy value is K2, an energy difference between the response factor having the greatest energy value and the response factor of the central device is further calculated, i.e., the energy difference $\delta$=K2−K1.

The energy difference $\delta$ is compared to a waking-up threshold $\delta d$. In response to the energy difference $\delta$ being greater than the waking-up threshold $\delta d$, the voice recognition device corresponding to the response factor having the greatest energy value is determined as the pending voice recognition device. In response to the energy difference $\delta$ being less than the waking-up threshold $\delta d$, the central device is determined as the pending voice recognition device.

While comparing and analyzing the response factors, two or more response factors may have the greatest energy value. In this case, the device that responds to the voice signal is determined based on the order of the waking-up priorities of the voice recognition devices. That is, among the voice recognition devices corresponding to the response factor having the greatest energy value, the voice recognition device having a highest priority is determined as the pending voice recognition device.

In an operation S204, the central device sends a notification to the non-central device, instructing the non-central device whether to respond to the voice signal.

After the central device determines the pending voice recognition device that will respond to the voice signal, the central device then sends a notification via the network to the non-central devices, i.e., to all voice recognition devices in the area network that are woken up but not yet respond to the voice signal, instructing the non-central devices whether or not to respond to the voice signal. The notification may be a specific yes to respond or not to respond. Alternatively, the notification may be device information of the determined voice recognition device that will respond to the voice signal. Alternatively, the notification may be sent only to the pending voice recognition device. Other voice recognition devices that do not receive the notification do not respond, whereas the voice recognition device that receives the notification responds to the voice signal.

In an operation S205, the pending voice recognition device responds to voice signal.

The determined voice recognition device responds to the voice signal, while other voice recognition devices do not respond. In this way, only one voice recognition device responds to the voice signal without causing the mutual interference.

The method shown in FIG. 2 is applied for voice waking-up recognition in a single area network. In the single area network, the voice recognition devices are woken up by the voice information but do not respond immediately. Instead, the central device in the single area network determines the device for responding, and then a response may be performed.

The waking-up and responding method for the multiple area networks is performed based on the determination of the pending voice recognition device in the single area network shown in FIG. 2. In detail, the multiple area networks refer to a plurality of interconnected area networks. The central devices in the multiple area networks are interconnected. The central devices are distinguished as one first central device and at least one second central device. After the pending voice recognition device in each area network is determined, the first central device further determines the voice recognition device that will respond to the voice signal.

The operations of the waking-up and responding method for each single area network of the multiple area networks will not be repeated. Further referring to FIG. 3, the waking-up and responding method for the multiple area networks also includes following operations.

In an operation S301, the second central device sends a second response factor to the first central device, and the first central device receives the second response factor.

In the multiple area networks, the first central device needs to compare the response factors of the pending voice recognition devices in all area networks, so as to determine the voice recognition device that responds to the central signal. The pending voice recognition device is the voice recognition device that responds to the voice signal and is determined in the single area network. In the multiple area networks, the pending voice recognition device determined in the single area network does not immediately respond. Instead, the first central device determines which one of a plurality of voice recognition devices responds to the voice signal, i.e., determines the final voice recognition device that responds to the voice signal. Therefore, in the present operation S301, the second central device sends the second response factor to the first central device, and the second response factor is the response factor of the pending voice recognition device in the respective area of the second central device.

For example, in the area A, the device A1 compares KA1, KA2, and KA3, and determines that the pending voice recognition device is the device A2. In the area B, the device B1 compares KB1, KB2, and KB3, and determines that the pending voice recognition device is the device B3. In the area C, the device C1 compares KC1 and KC2, and determines that the pending voice recognition device is the device C1.

The device B1 sends the response factor KB3 of the pending voice recognition device B3 in the respective area network to the device A1, and the device C1 sends the response factor KC1 to the device A1. The response factor of the pending voice recognition device A2 determined by the device A1 is KA2.

In an operation S302, the first central device compares the second response factor and the first response factor to determine the voice recognition device that responds to the voice signal.

The first central device compares the response factors, i.e., the first response factors and the second response factors, of each pending voice recognition device. The first response factor is the response factor of the pending voice recognition device in the area network in which the first central device is located.

The comparison process of the present operation S302 is similar to the comparison process of the operation S203 and will not be repeated herein.

For example, the energy value of the first response factor and the energy value of the second response factor may be compared to obtain the response factor having the largest energy value. The voice recognition device corresponding to the response factor having the largest energy value may be determined to respond to the voice signal.

In another example, the energy value of the first response factor may be compared to the energy value of the second response factor to obtain the response factor having the largest energy value. In response to the response factor having the largest energy value being the first response factor, the first central device responds to the voice signal. In response to the response factor having the largest energy value being the second response factor, an energy difference between the response factor having the largest energy value and the first response factor may be calculated. The energy difference may be compared with a waking-up threshold. In response to the energy difference being greater than the waking-up threshold, the voice recognition device corresponding to the response factor having the greatest energy value responds to the voice signal. In response to the energy difference being less than the waking-up threshold, the first central device responds to the voice signal.

In some embodiments, the device A1 compares KA2, KB3, and KC1, thereby determining the voice recognition device that responds to the voice signal, for example, the device B2.

Similarly, two or more response factors having the largest energy value may be obtained. In this case, the device that responds to the voice signal may further be determined based on the order of the waking-up priorities of the voice recognition devices. That is, among the voice recognition devices corresponding to the response factors having the largest energy value, the one having the highest waking-up priority is determined as the pending voice recognition device.

In an operation S303, the first central device sends the notification to the other voice recognition devices in the multiple area networks, instructing the voice recognition devices whether to respond to the voice signal.

After the first central device determines the voice recognition device that responds to the voice signal, the first central device may send the notification directly to the entire network, i.e., to the multiple area networks. Alternatively, the first central device may firstly send the notification to the central device of each area network, and each central device may send the notification to the non-central devices. Similarly, the notification may be sent to the voice recognition device that responds to the voice signal only, other voice recognition devices that do not receive the notification do not respond to the voice signal.

In an operation S304, the determined voice recognition device responds to the voice signal.

The operation S304 may be similar to the operation S205 in the above, which will not be repeated herein.

The method shown in FIG. 3 may be applied for waking-up and responding in multiple areas. After the voice recognition device that responds to the voice signal in each area is determined, the first central device further determines the voice recognition device in which area should respond to the voice signal. In this way, only one voice recognition device responds to the voice signal.

In the network which applied the method shown in in FIG. 2 and FIG. 3, an order of waking-up priorities is present for the voice recognition devices. Therefore, when the voice recognition device having the highest priority is malfunctional, the voice recognition device having a next waking-up priority may be determined as the central device or first central device based on the order of the waking-up priorities.

For the voice recognition device, the voice recognition device can periodically detect whether the voice recognition device has the highest waking-up priority in the respective area network, and detect whether the voice recognition device has the highest waking-up priority when the area network is changed. When the voice recognition device determines that the voice recognition device has the highest waking-up priority in the current area network, that is, in response to determining that the voice recognition device has the highest waking-up priority in the area network, the voice recognition device operates as the central device.

According to the waking-up and responding method in the network shown in some embodiments, the order of waking-up priorities is present for the voice recognition devices in the network, and the voice recognition device, serving as the central device, can compare the response factors. Therefore, any new voice recognition device that joined the network also needs to comply with the waking-up mechanism of some embodiments. The central device may perform relevant settings.

The central device can obtain device information of the voice recognition device that joins the network. The central device analyzes the device information based on preset rules in order to reorder the waking-up priorities of the voice recognition devices in the network.

Each voice recognition device is configured with a voice recognition system, and the voice recognition system determines the waking-up priority, a voice recognition algorithm, the waking-up template, and the like. If a new voice recognition device that joins the network has a different voice recognition system, i.e., the new voice recognition device has a different waking-up priority setting, the network central device can reorder the waking-up priorities based on the waking-up priority setting of the network central device. For example, in a network A1-A2-A3, a new voice recognition device A4 joins the network, and a waking-up priority of the device A4 is set to be greater than that of the device A3. The waking-up priorities can be reordered as A1>A2>A4>A3.

When the new voice recognition device that joins the network has the same voice recognition system, i.e. the new voice recognition device has the same waking-up priority setting, the waking-up priority of the voice recognition device that joined the network at an earliest stage may be the highest waking-up priority. For example, a new voice recognition device A3 joins the network, and has the same voice recognition system as the previous device A3, the previous device A3 serves as a device A31 and the new device A3 serves as a device A32, and the waking-up priorities are reordered as A1>A2>A31>A32.

For the network of some embodiments, all operations to implement the waking-up and responding method can be done within the network. Therefore, the voice recognition devices of some embodiments can operate offline.

In the single area network formed by the above voice recognition devices being interconnected with each other, the voice recognition device serves as two roles, one as the central device and the other as the non-central device. Each voice recognition device can serve as the central device having more powerful and a greater number of functions. Alternatively, each voice recognition device can serve as the non-central device having lighter functions only.

In the field of domestic appliances, a large-sized domestic appliance, such as a refrigerator, a television, and the like, may apply a voice recognition system having more functions, such that large-sized domestic appliance can serve as the central device. A small-sized domestic appliance, such as a rice cooker, a kettle, and the like, may apply a voice recognition system having lighter functions, such that small-sized domestic appliance can only serve as the non-central device.

Figure 4:
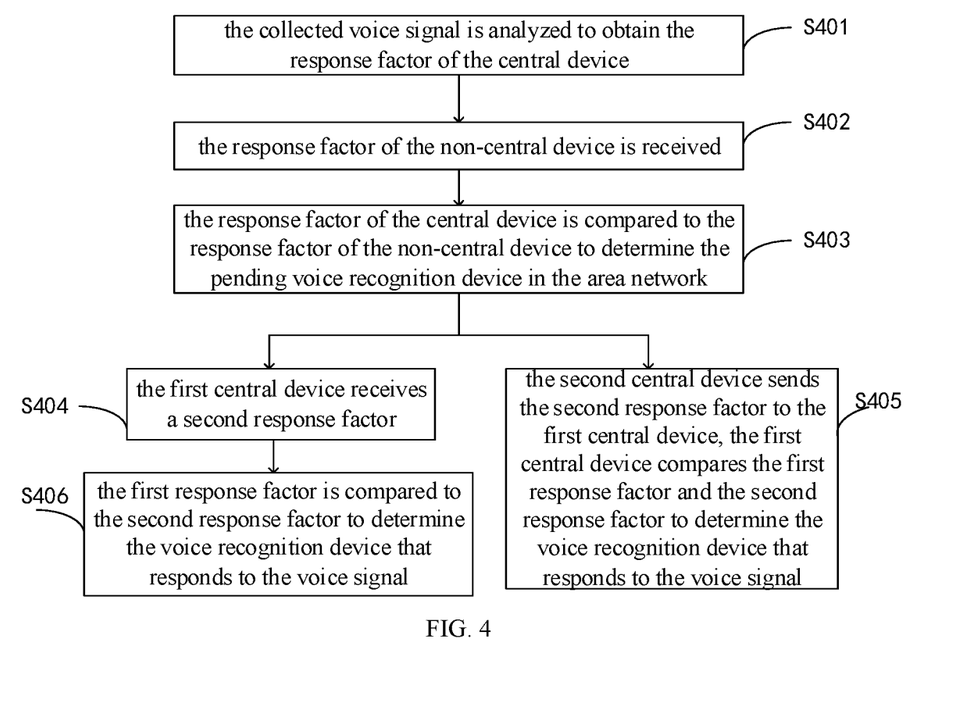
FIG. 4 is a flow chart of a waking-up and responding method of a voice recognition device, which is applied in a central device, according to the present disclosure.

For the voice recognition device that serves as the network central device, the operations for implementing the waking-up and responding method are shown in FIG. 4. FIG. 4 is a flow chart of the waking-up and responding method performed by the voice recognition device according to the present disclosure.

As the network central device, performing the waking-up and responding method includes following operations.

In an operation S401, the acquired voice signal is analyzed to obtain the response factor of the central device.

For each central device in the area network, the operation S401 is completed while performing the above operation S201, which will not be repeated herein.

In an operation S402, the response factor of the non-central device is received.

The operation S402 corresponds to the above operation S202 and will not be repeated herein.

In an operation S403, the response factor of the central device is compared to the response factor of the non-central device to determine the pending voice recognition device in the area network.

The operation S403 is similar to the above operation S203 and will not be repeated herein.

The above operations are illustrated by taking the role of the voice recognition device as the central device to illustrate the operations of implementing the waking-up and responding method in the single area network. Specific details of each operation and specific detail of how the central device operates are also described in the above, and therefore, will not be repeated. In some embodiments, the voice recognition device can determine one voice recognition device, which responds to the voice signal, from a plurality of voice recognition devices. In this way, the problem of mutual interference caused by all voice recognition devices responding to the voice signal may be avoided.

Further, in multiple area networks, the central device includes a first central device and a second central device. The first central device further performs following operations.

In an operation S404, the first central device receives a second response factor.

The present operation S404 is completed while performing the operation S301, which will not be repeated.

In an operation S406, the first response factor is compared to the second response factor to determine the voice recognition device that responds to the voice signal.

The present operation S406 is similar to the operation S302, which will not be repeated.

The second central device performs the following operations.

In an operation S405, the second central device sends the second response factor to the first central device, the first central device compares the first response factor and the second response factor to determine the voice recognition device that responds to the voice signal.

The present operation S405 is completed while performing the operations S301-S302, which will not be repeated.

Further, in the multiple area networks, the first central device further determines the voice recognition device in which one of the multiple area networks to respond to the voice signal.

Figure 5:
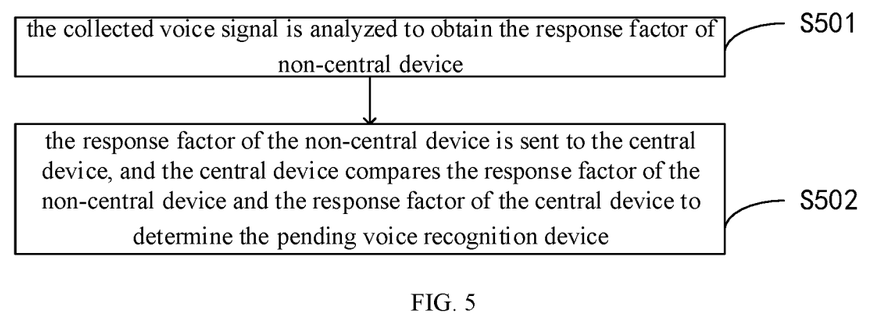
FIG. 5 is a flow chart of a waking-up and responding method of a voice recognition device, which is applied in a non-central device, according to the present disclosure.

From the perspective of the non-central devices, the operations of implementing the waking-up and responding method are shown in FIG. 5, which is a flow chart of the non-central device performing the waking-up and responding method of the voice recognition device according to the present disclosure. The voice recognition device is the non-central device. In some embodiments, the waking-up and responding method includes the following operations.

In an operation S501, the acquired voice signal is analyzed to obtain the response factor of non-central device.

The present operation S501 is similar to the operation S201, which will not be repeated.

In an operation S502, the response factor of the non-central device is sent to the central device, and the central device compares the response factor of the non-central device and the response factor of the central device to determine the pending voice recognition device.

As the non-central device, after the non-central device acquires the voice signal, the non-central device does not respond to the voice signal immediately, but performs calculation and analysis to obtain the response factor. The non-central device then transmits the response factor to the central device for analysis and comparison. The central device determines the voice recognition device that responds to the voice signal.

Some embodiments are illustrated by taking the voice recognition device as the non-central device to illustrate the operations of implementing the waking-up and responding method. Specific details of each operation and specific details of how the non-central device operates are also described in the above, and will not be repeated. In some embodiments, the voice recognition device does not respond to the voice signal immediately after receiving the voice signal, but decides whether to respond after receiving the notification. In this way, the problem of mutual interference caused by various voice recognition devices responding to the voice signal at the same time may be avoided.

Figure 6:
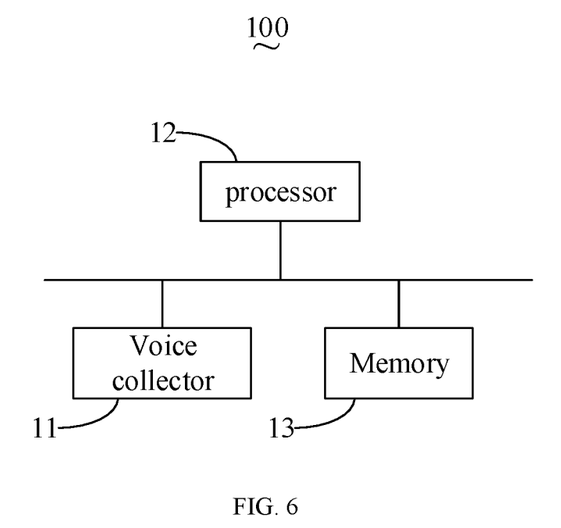
FIG. 6 is a structural schematic view of a voice recognition device according to some embodiments of the present disclosure.

The above waking-up and responding method is implemented by the voice recognition device. Therefore, the present disclosure further provides a voice recognition device, shown in FIG. 6. FIG. 6 is a structural schematic view of the voice recognition device according to some embodiments of the present disclosure. In some embodiments, the voice recognition device 100 may be a domestic electric appliance and include a voice collector 11, a processor 12 and a memory 13, all of which are interconnected with each other. In some embodiments, the voice recognition device 100 can implement the waking-up and responding method shown in the above embodiments. The voice collector 11 is configured to collect the voice signal, the memory 13 stores a computer program, and the processor 12 is configured to execute the computer program to implement the above-mentioned waking-up and responding method.

In detail, the voice collector 11 is configured to collect the voice signal. The processor 12 is configured to analyze the collected voice signal to obtain the response factor and compare all the response factors based on a preset algorithm to determine the voice recognition device that responds to the voice signal and send the notification to other voice recognition devices, instructing voice recognition devices whether to respond to the voice signal.

Alternatively, the voice collector 11 is configured to collect the voice signal. The processor 12 is configured to analyze the collected voice signal to obtain the response factor, send the response factor to the central device, and determine whether to respond based on the received notification which instructs whether to respond to the voice signal and is sent from the central device.

Alternatively, the processor 12 may be an integrated circuit chip with a signal processing capability. The processor 12 may also be a general-purpose processor, a digital signal processor (DSP), an application-specific integrated circuit (ASIC), a field-programmable gate array (FPGA) or other programmable logic devices, a discrete gate or transistor logic device, or a discrete hardware component. The general-purpose processor may be a microprocessor, or the processor may be any conventional processor.

Figure 7:
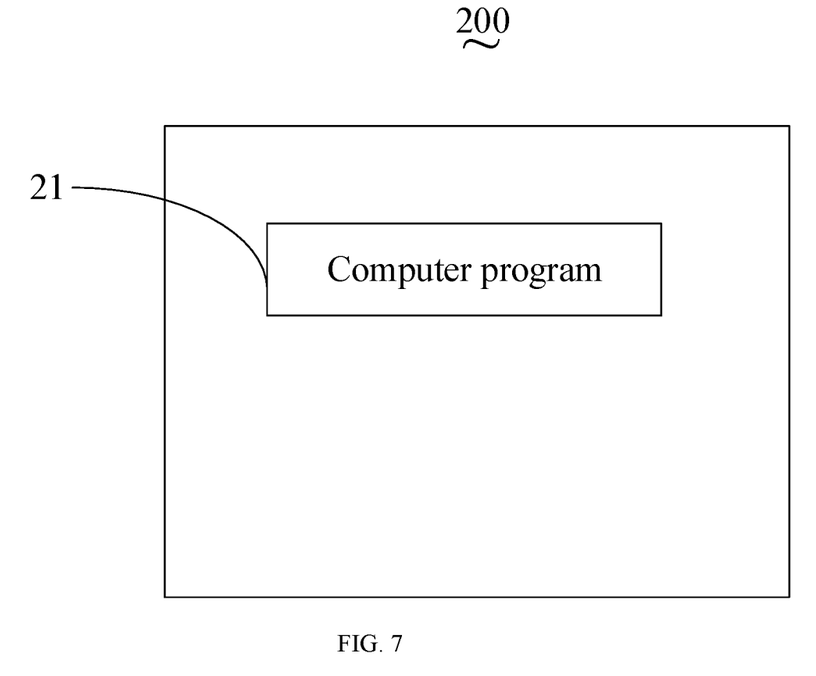
FIG. 7 is a structural schematic view of a computer storage medium according to some embodiments of the present disclosure.

The method in the above embodiments may exist in a form of a computer program. Therefore, the present disclosure provides a computer storage medium, shown in FIG. 7. FIG. 7 is a structural schematic view of the computer storage medium according to some embodiments of the present disclosure. The computer storage medium 200 in some embodiments store computer programs 21. The computer programs can be executed to implement the method in the above embodiments.

The computer storage medium 200 in some embodiments may be a universal serial bus disk, a portable hard disk, a read-only memory (ROM), a random access memory (RAM), a magnetic disk or an optical disk, or other medium that can store program instructions, or may be a server that stores the program instructions. The server can send the stored program instructions to other devices to run, or can also run the stored program instructions itself.

In the several embodiments provided in the present disclosure, it should be understood that, the disclosed methods and devices can be implemented by other means. For example, the embodiments of the devices described in the above are merely exemplary. For example, modules or units are divided based on logical functions, and practically, can be divided by other means. For example, multiple units or components can be combined or integrated into another system, or some features can be omitted or not implemented. On another point, mutual coupling or direct coupling or communicative connection shown or discussed can be indirect coupling or communicative connection between devices or units through some interfaces, and can be electrical, mechanical or in other forms.

Units illustrated as separate components may or may not be physically separated. Components displayed as units may or may not be physical units. That is, the components may be located in one location or may be distributed to multiple network units. Some or all of these units can be selected according to practical needs to achieve the purpose of the present implementation.

In addition, various functional units in the various embodiments of the present disclosure can be integrated in one processing unit. Alternatively, each unit can be physically present separately. Alternatively, two or more units can be integrated in one unit. The above integrated units can be implemented either in the form of hardware or in the form of software functional unit.

When the integrated unit is implemented in the form of software functional unit and sold or used as an independent product, the integrated unit may be stored in a computer-readable storage medium. It is understood that the technical solution of the present application, or a part of the technical solution that contributes to the related art, or a part or all of the technical solution may be implemented in the form of a software product. The software product is stored in a storage medium and includes a number of instructions to cause a computer device (which may be a personal computer, a server, or a network device, and the like) or a processor to perform all or some of the operations of the various embodiments of the methods of the present disclosure. The aforementioned storage medium includes: a universe serial bus disk, a portable hard disk, a read-only memory (ROM, Read-Only Memory), a random access memory (RAM, Random Access Memory), a magnetic disk or an optical disk, and other medium that can store program codes.

The above description shows only implementations of the present disclosure, but does not limit the scope of the present disclosure. Any equivalent structural or equivalent process transformation performed based on the specification and the accompanying drawings of the present disclosure, directly or indirectly applied in other related technical fields, shall be included in the scope of the present disclosure.

What is claimed is:

1. A waking-up and responding method of a voice recognition device, wherein a plurality of voice recognition devices form an area network, the plurality of voice recognition devices comprise one central device and at least one non-central device, and the waking-up and responding method comprises:
   analyzing, by the central device, a collected voice signal;
   obtaining a response factor of the central device;
   receiving a response factor of the non-central device, wherein the response factor of the non-central device is obtained by the non-central device analyzing a collected voice signal;
   comparing the response factor of the central device with the response factor of the non-central device; and
   determining a pending voice recognition device, wherein the pending voice recognition device is one of the plurality of voice recognition devices in the area network that responds to the voice signal, wherein the comparing the response factor of the central device with the response factor of the non-central device, and the determining a pending voice recognition device, comprises:
   comparing an energy value of the response factor of the central device with an energy value of the response factor of the non-central device to obtain a response factor having a greatest energy value;
   determining whether the response factor having the greatest energy value is the response factor of the central device;
   determining the central device to be pending voice recognition device in response to the response factor having the greatest energy value being the response factor of the central device;
   calculating an energy difference between the response factor having the greatest energy value and the response factor of the central device in response to the response factor having the greatest energy value being not the response factor of the central device;
   comparing the energy difference value with a waking-up threshold;

determining the voice recognition device corresponding to the response factor having the greatest energy value to be the pending voice recognition device in response to the energy difference being greater than the waking-up threshold; and determining the central device to be the pending voice recognition device in response to the energy difference being less than or equal to the waking-up threshold.

2. The waking-up and responding method according to claim 1, wherein the comparing the response factor of the central device with the response factor of the non-central device, and the determining a pending voice recognition device, comprises:

comparing an energy value of the response factor of the central device with an energy value of the response factor of the non-central device to obtain a response factor having a greatest energy value; and determining a voice recognition device corresponding to the response factor having the greatest energy value to be the pending voice recognition device.

3. The waking-up and responding method according to claim 2, wherein each of the plurality of voice recognition devices has a waking-up priority, and the determining the voice recognition device corresponding to the response factor having the greatest energy value to be the pending voice recognition device, comprises:

determining one voice recognition device from all voice recognition devices corresponding to the response factor having the greatest energy value to be the pending voice recognition device.

4. The waking-up and responding method according to claim 1, further comprising:

sending, by the central device, a notification to the non-central device, instructing the non-central device whether to respond to the voice signal.

5. The waking-up and responding method according to claim 1, wherein a plurality of area networks are interconnected, a plurality of central devices in all of the plurality of area networks comprise one first central device and at least one second central device, and the waking-up and responding method further comprises:

sending, by the second central device, a second response factor to the first central device, comparing, by the first central device, the second response factor with a first response factor to determine a voice recognition device that responds to the voice signal;

wherein the first response factor is the response factor of the pending voice recognition device in an area network in which the first central device is located, and the second response factor is the response factor of the pending voice recognition device in an area network in which the second central device is located.

6. The waking-up and responding method according to claim 5, wherein the comparing the second response factor with the first response factor to determine the voice recognition device that responds to the voice signal, comprises:

comparing an energy value of the first response factor with an energy value of the second response factor to obtain a response factor having a greatest energy value; and determining a voice recognition device corresponding to the response factor having the greatest energy value to respond to the voice signal.

7. The waking-up and responding method according to claim 6, wherein each of the plurality of voice recognition devices has a waking-up priority, and the determining the voice recognition device corresponding to the response factor having the greatest energy value to respond to the voice signal, comprises:

determine one voice recognition device from all voice recognition devices corresponding to the response factor having the greatest energy value to respond to the voice signal.

8. The waking-up and responding method according to claim 5, wherein the comparing the second response factor with the first response factor to determine the voice recognition device that responds to the voice signal, comprises:

comparing an energy value of the first response factor with an energy value of the second response factor to obtain a response factor having the greatest energy value;

determining whether the response factor having the greatest energy value is the first response factor;

determining the first central device to respond to the voice signal in response to the response factor having the greatest energy value being the first response factor;

calculating an energy difference between the response factor having the greatest energy value and the first response factor in response to the response factor having the greatest energy value being not the first response factor;

comparing the energy difference value with a waking-up threshold;

determining a voice recognition device corresponding to the response factor having the greatest energy value to respond to the voice signal in response to the energy difference being greater than the waking-up threshold; and determining the first central device to respond to the voice signal in response to the energy difference being less than or equal to the waking-up threshold.

9. The waking-up and responding method according to claim 8, wherein each of the plurality of voice recognition devices has a waking-up priority, and the determining the voice recognition device corresponding to the response factor having the greatest energy value to respond to the voice signal, comprises:

determine one voice recognition device from all voice recognition devices corresponding to the response factor having the greatest energy value to respond to the voice signal.

10. The waking-up and responding method according to claim 5, further comprising:

sending, by the first central device, a notification to each of the plurality of voice recognition devices in each of the plurality of area networks, instructing each of the plurality of voice recognition devices whether to respond to the voice signal.

11. The waking-up and responding method according to claim 1, wherein a plurality of area networks are interconnected, a plurality of central devices in all of the plurality of area networks comprise one first central device and at least one second central device, and the waking-up and responding method further comprises:

receiving, by the first central device, a second response factor, wherein the second response factor is the response factor of the pending voice recognition device in an area network in which the second central device is located; and comparing the second response factor with a first response factor to determine the voice recognition device that responds to the voice signal, wherein the first response factor is the response factor of the pending voice recognition device in an area network in which the first central device is located.

12. The waking-up and responding method according to claim 1, wherein the response factor is referred to as the response factor of the central device and the response factor of the non-central device, and the analyzing the collected voice signal and obtaining the response factor, comprises:
calculating an energy value of the obtained response factor based on voice characteristics of the voice signal and a matching degree between the voice signal and a waking-up template of the voice recognition device.

13. The waking-up and responding method according to claim 12, wherein the calculating the energy value of the obtained response factor based on voice characteristics of the voice signal and the matching degree between the voice signal and the waking-up template of the voice recognition device, comprises:
calculating a waking-up energy based on the voice characteristics of the voice signal, calculating a ground noise energy based on voice characteristics of environmental noise in an environment at which the voice recognition device is located, taking a difference between the waking-up energy and the ground noise energy as an effective energy;
calculating a confidence degree based on the matching degree between the voice signal and the waking-up template; and
performing a weighted summation on the effective energy and the confidence degree to obtain the energy value of the response factor.

14. A waking-up and responding method of a voice recognition device, wherein a plurality of voice recognition devices form an area network, the plurality of voice recognition devices comprise one central device and at least one non-central device, and the waking-up and responding method comprises:
analyzing, by the non-central device, a collected voice signal, obtaining a response factor of the non-central device;
sending the response factor of the non-central device to the central device, comparing, by the central device, the response factor of the non-central device with the response factor of the central device to determine a pending voice recognition device, wherein the pending voice recognition device is one of the plurality of voice recognition devices in the area network that responds to the voice signal, wherein the central device compares an energy value of the response factor of the central device with an energy value of the response factor of the non-central device to obtain a response factor having a greatest energy value;
determining whether the response factor having the greatest energy value is the response factor of the central device;
determining the central device to be the pending voice recognition device in response to the response factor having the greatest energy value being the response factor of the central device;
calculating an energy difference between the response factor having the greatest energy value and the response factor of the central device in response to the response factor having the greatest energy value not being the response factor of the central device;
comparing the energy difference with a waking-up threshold;
determining the voice recognition device corresponding to the response factor having the greatest energy value to be the pending voice recognition device in response to the energy difference being greater than the waking-up threshold; and
determining the central device to be the pending voice recognition device in response to the energy difference being less than or equal to the waking-up threshold.

15. The waking-up and responding method according to claim 14, wherein the comparing, by the central device, the response factor of the non-central device with the response factor of the central device to determine the pending voice recognition device, comprises:
comparing, by the central device, an energy value of the response factor of the central device with an energy value of the response factor of the non-central device to obtain a response factor having a greatest energy value; and
determining a voice recognition device corresponding to the response factor having the greatest energy value to be the pending voice recognition device.

16. The waking-up and responding method according to claim 15, wherein each of the plurality of voice recognition devices has a waking-up priority, and the determining the voice recognition device corresponding to the response factor having the greatest energy value to be the pending voice recognition device, comprises:
determining one voice recognition device from all voice recognition devices corresponding to the response factor having the greatest energy value to be the pending voice recognition device.

17. The waking-up and responding method according to claim 14, wherein the response factor is referred to as the response factor of the central device and the response factor of the non-central device, and the analyzing the collected voice signal and obtaining the response factor, comprises:
calculating an energy value of the obtained response factor based on voice characteristics of the voice signal and a matching degree between the voice signal and a waking-up template of the voice recognition device.

18. The waking-up and responding method according to claim 17, wherein the calculating an energy value of the obtained response factor based on voice characteristics of the voice signal and a matching degree between the voice signal and a waking-up template of the voice recognition device, comprises:
calculating a waking-up energy based on the voice characteristics of the voice signal, calculating a ground noise energy based on voice characteristics of environmental noise in an environment at which the voice recognition device is located, taking a difference between the waking-up energy and the ground noise energy as an effective energy;
calculating a confidence degree based on the matching degree between the voice signal and the waking-up template; and
performing a weighted summation on the effective energy and the confidence degree to obtain the energy value of the response factor.

* * * * *